United States Patent [19]

Brose et al.

[11] 3,984,584

[45] Oct. 5, 1976

[54] OPAQUE COATINGS AND FILMS PRODUCED BY THE HARDENING OF SYNTHETIC RESINS WITH LIGHT

[75] Inventors: Horst Brose; Karl Dieter Depping, both of Hiltrup; Dietrich Hentschel, Wolbeck; Bernard Kostevc, Munster; Klaus Schmidt, Hiltrup, all of Germany

[73] Assignee: BASF Farben & Fasern Aktiengesellschaft

[22] Filed: Dec. 11, 1973

[21] Appl. No.: 423,745

[30] Foreign Application Priority Data

Dec. 27, 1972  Germany............................ 2263459

[52] U.S. Cl.............................. 427/54; 204/159.22
[51] Int. Cl.$^2$........................................... B05D 3/06
[58] Field of Search............... 117/93.31, 14 K, 166; 204/159.22; 260/16; 427/54, 53, 44

[56] References Cited
UNITED STATES PATENTS

| | | | |
|---|---|---|---|
| 3,642,672 | 2/1972 | Kroekel | 260/16 |
| 3,669,728 | 6/1972 | Seiner | 117/161 UF |
| 3,701,748 | 10/1972 | Kroekel | 260/40 R |
| 3,823,027 | 7/1974 | Wismer et al. | 117/93.31 |

Primary Examiner—John H. Newsome
Attorney, Agent, or Firm—Gilbert L. Wells

[57] ABSTRACT

Opaque coatings or films having a high covering capacity produced from coating compositions containing synthetic resins, fillers, solvents, common catalysts, sensitizers, additives and auxiliary agents, characterized in that radiation permeable mixtures of coating compositions are used containing the following components:

A. 14 – 20 parts by weight, preferably 15 – 18 parts by weight, photosensitized light curing condensation resins having double bond values of 0.180 to 0.450;

B. 55 – 75 parts by weight, preferably 65 – 70 parts by weight, of fillers having a low covering capacity;

C. 0.5 – 10 parts by weight, preferably 1 – 6 parts by weight, of film forming cellulose derivatives or mixed polymerizates of vinyl chloride with other monomers which are compatible with A and D; and D. 8 – 30 parts by weight, preferably 10 – 20 parts by weight, of non-reactive solvents in which optionally up to 5 parts by weight of the component D may be substituted by monomeric copolymerizable solvents; and the coating compositions are applied to a substrate and cured by irradiation with UV light, sunlight or powerful ionizing rays.

4 Claims, No Drawings

OPAQUE COATINGS AND FILMS PRODUCED BY THE HARDENING OF SYNTHETIC RESINS WITH LIGHT

CROSS-REFERENCES TO RELATED APPLICATIONS

Applicants claim priority under 35 U.S.C. 119 for Application P 22 63 459.9, filed Dec. 27, 1972 in the U.S. Pat. Office of the Federal Republic of Germany.

The disclosure of copending application Ser. No. 404,660, of Horst Brose et al, filed Oct. 9, 1973 in the U.S. Pat. Office is incorporated herein. This application discloses the state of the art of coating a substrate with a cured synthetic resin which comprises depositing a liquid film composition of a synthetic resin (I) selected from the group consisting of:
  a. unsaturated polyester resins with copolymerizable monomers, a peroxide curing agent and an accelerator;
  b. synthetic resins curable by condensation with a polyisocyanate catalyst; and
  c. synthetic resins curable by condensation with an acid catalyst on said substrate and subjecting said composition to radiation; the improvement comprising:
    said liquid film composition containing said synthetic resin (I) dissolved in organic solvents together with pigments having high hiding power (II) in the ratio (I) 50 – 97 percent to (II) 3 – 50 percent by weight and forming a coating of about 0.002 to 0.012 inches thickness after drying and curing with electromagnetic radiation produced by a high pressure mercury vapor lamp.

BACKGROUND OF THE INVENTION

The field of the invention is coating processes using electrical or radiant energy, wherein synthetic resin is contained in the coating. The present invention is particularly concerned with a process for producing covering, opaque films and coatings from coating compositions containing light curable synthetic resins.

The use of light curable synthetic resins, characterized by the presence of unsaturated groups, in coating compositions for producing coatings is already known. Solutions of unsaturated polyester in copolymerizable monomers are used as coating compositions for wood, metal and other substrates.

It is known that the light curing synthetic resins is effected by irradiation of UV light. In principle, photochemically effective sensitizers which permit polymerization of the unsaturated portions of the synthetic resin are used in this process. The UV hardening process can only be used if the coating composition contains no substances which prevent the passage of the rays. In practice, this means that only transparent coating compositions can be cured by means of UV rays. Thus, transparent coatings are obtained from transparent coating agents using the light curing process.

If it is wished to obtain covering, opaque coatings, the coating composition must contain covering pigments or dyes. The UV hardening process cannot be used in these cases.

The term "coating compositions" in this text refers to all liquid forms of preparations which are necessary for producing coatings, films and lacquer components such as pore filler, coating lacquer, primer, filler, etc.

The term "coatings" in the present text refers to all layers, coatings, lacquers or films, obtained from the above-mentioned coating compositions.

The term "light curable" as used in the text refers to coating compositions which can be cured by irradiation with UV light, sunlight or powerful ionizing rays.

The term "light curing" refers to the process of curing using UV light, sunlight or powerful ionizing radiation.

Irradiation curing processes, according to the state of the art, are summarized, for example, in "The Light Hardening of Polyester Lacquers" (Die Lichthartung von Polyesterlacken) Eugen Richter, Moderne Holzverarbeitung (Modern Wood Processing), Vol. 10, (1968), pages 604 – 606 and "Lackhartung durch ultraviolettes Licht" (Lacquer Hardening by Ultraviolet Light), Dr. W. Deninger and Dr. M. Partheiger, Industrie-Lackier-Betrieb, 37 Jg. V.3, March 1969, pages 85 – 91.

The state of the art of photopolymerizable compositions may be ascertained by reference to U.S. Pat. Nos. 3,196,098 of Walter Edwing Mochel, 3,008,242 of Sites et al, 3,013,895 of Agruss, 3,060,023 of Burg et al, 3,511,687 of Keyl et al, and 3,551,311 of Nass et al, and Belgian Pat. No. 714,605, the disclosures of which are incorporated herein.

U.S. Pat. No. 3,511,687 discloses the state of the art of curing of polyester resin coatings by radiant energy. The resins used in the patent are disclosed in U.S. Pat. Nos. 3,006,878 and 2,852,487.

SUMMARY OF THE INVENTION

An object of the present invention is to provide a process for producing covering, opaque coatings using the irradiation curing process. By this process opaque covering coatings with a high covering capacity can be produced using relatively simple irradiation curing. The application range of irradiation curing has thus been substantially increased.

The above task was solved in a surprising manner by a process for producing opaque coatings or films having a high covering capacity from coating compositions containing synthetic resins, fillers, solvents, common catalysts, sensitizers, additives and auxiliary agents, characterized in that radiation permeable mixtures of coating compositions comprising the components:
  A. 14 – 20 parts by weight, preferably 15 – 18 parts by weight, of photosensitized light curing condensation resins with double bond values of 0.180 to 0.450, preferably 0.190 to 0.420;
  B. 55 – 75 parts by weight, preferably 65 – 70 parts by weight, of fillers having a low covering capacity;
  C. 0.5 – 10 parts by weight, preferably 1 – 6 parts by weight, of film forming cellulose derivatives or mixed polymerizates of vinyl chloride and other monomers compatible with A and D; and
  D. 8 – 30 parts by weight, preferably 10 – 20 parts by weight, of non-reactive solvents, in which optionally up to 5 parts by weight of the component D are substituted by monomeric copolymerizable solvents, are applied to a substrate and cured by irradiation with UV light, sunlight, or powerful ionizing rays.

The present invention also relates to a coating composition based on synthetic resins, fillers, solvents, common catalysts, sensitizers, additives and auxiliary agents for effecting the process for producing opaque coatings having a high covering capacity, characterized in that the coating composition is a radiation permeable mixture of the following components:
  A. 14 – 20 parts by weight, preferably 15 – 18 parts by weight, of photosensitized, light curing condensation resins having double bond values of 0.180 to 0.450, preferably 0.190 to 0.420;
  B. 55 – 75 parts by weight, preferably 65 – 70 parts by weight, of fillers having a low covering capacity;
  C. 0.5 – 10 parts by weight, preferably 1 – 6 parts by weight, of film forming cellulose derivatives or mixed polymerizates of vinyl chloride and other monomers compatible with A and D;
  D. 8 – 30 parts by weight, preferably 10 – 20 parts by weight, of non-reactive solvents in which optionally up to 5 parts by weight of the component D may be substituted by monomeric copolymerizable solvents.

The process may be further developed in that the coating compositions also contain additional color producing substances in the form of dyes.

It was surprising and unforeseeable that opaque, hardened layers or coatings which are no longer transparent but are opaque, have a white appearance and a high covering capacity could be obtained from light, curable, transparent coating compositions by light curing through the process according to the invention. It was also surprising that the degree of whiteness of the coatings hardened by the process according to the invention was higher than the degree of whiteness obtained from the normal hardenable synthetic resins containing titanium dioxide as white pigment. The opaque, covering, white layers possess outstanding technological properties which could only previously be obtained using high pigmented coating compositions in other hardening processes than the light hardening process. The advance in the art of the present invention is quite significant. The range of the light curing process can be considerably extended and expensive pigments such as titanium dioxide no longer need to be used as it is now possible to obtain opaque coatings from transparent coating compositions.

Opaque covering coatings are obtained from coating compositions by the light curing process by selecting a special relationship between the components of the radiation permeable mixture of the coating composition.

The relationship is such that the proportions by weight of the individual components are the following:
  A. 14 – 20 parts, preferably 15 – 18 parts by weight, of photosensitized, light hardening condensation resins having double bond values of 0.180 to 0.450;
  B. 55 – 75 parts by weight, preferably 65 – 70 parts by weight, of filler having a low covering capacity;
  C. 0.5 – 10 parts by weight, preferably 1 – 6 parts by weight, cellulose derivatives or mixed polymerizates of viniy chloride containing other monomers; and
  D. 8 – 30 parts by weight, preferably 10 – 20 parts by weight, of non-reactive solvents, of which optionally up to 5 parts may be substituted by monomeric, copolymerizable solvents.

Opaque, covering coatings are obtained from transparent, liquid coating compositions after hardening only if the above-indicated proportions are observed. If these limits are not observed, either clear, transparent coatings are obtained or no other commercially utilizable coatings can be produced. To effect the process according to the invention, it is essential that cellulose derivatives or mixed polymerizates of vinyl chloride which are compatible with the components A and D and which form cohesive films from solvents after the evaporation thereof, are present. If an amount is used which is less than 0.5 percent, the resulting coatings do not possess a complete covering capacity. Non-uniform, commercially non-utilizable coatings are obtained if the amount exceeds 10 percent.

DESCRIPTION OF THE PREFERRED EMBODIMENTS

COMPONENT A

Photosensitized, light hardening condensation resins which have a double bond value of the molecule of 0.180 to 0.450 are used as component A in the radiation permeable coating compositions.

The preferred double bond values are between 0.190 and 0.420.

Especially good results are obtained with these values. The condensation resins of component A include unsaturated polyester resins which are known to be condensation products from multivalent alcohols and unsaturated dicarboxylic acids. These resins are disclosed in application Ser. No. 404,660 filed Oct. 9, 1973, now abandoned and are described in detail in the following standard works: "Polyesters and Their Applications," Bjorksten, Tovay, Harker and Henning, N.Y., Reinhold Publishing Corp., 1965, and in "Polyester Resins," Lawrence, N.Y., Reinhold Corp., 1965, and in "Unsaturated Polyesters: Structure and Properties," Honing, Amsterdam, Elsevier Publishing Company, 1964.

In the process according to the invention, polymerizable monomers need not be used. The condensation resins of component A may also contain unsaturated monocarboxylic acids, unsaturated alcohols and other unsaturated groups in general in various forms of bonds or as mixtures of various synthetic resins.

The determination of double bond values of unsaturated condensation resins as described in the periodical "Kunststoffe," V. 55 (1965), pages 840–842. This is based on the principle that dodecyl mercaptan in an alkaline medium is easily added to double bonds of the ethylenedicarboxylic acid type. Double bond value is a measure of the double bond content of the polyester of the ethylene dicarboxylic acid type. It is expressed in terms of double bond equivalents / 100 grams of resin molecule.

COMPONENT B

Suitable fillers having a low covering capacity are inorganic fine powdered substances such as silicon dioxide, calcium carbonate, barium sulfate, talcum, mica, dolomite, quartz powder, stone powder, glass powder or fibrous microsubstrates of asbestos, plastics, glass or textile products. Fillers in general not having a refraction index above 1.70 and which do not have a substantial adverse effect on the radiation transmission of the coating composition according to the invention may be used.

COMPONENT C

The esterification products of cellulose with organic or inorganic acids are suitable for use as cellulose derivatives which are compatible with A and soluble in D and which produce cohesive films by evaporation of the solvent. The following are cited by way of example:

nitrocellulose, cellulose acetate, cellulose propionate, cellulose butyrate or mixed esters of organic acids containing up to 10 carbon atoms, such as cellulose acetobutyrate. Mixed polymerizates of vinyl chloride with other monomers such as acrylic acid esters, maleic and fumaric acid esters, vinylether, vinylacetate, vinylidene chloride, styrene or acrylonitrile may be used in place of the cellulose derivatives.

COMPONENT D

The non-reactive solvents are generally used in the form of mixtures of various individual components associated with different chemical classes. These solvents are aliphatic and aromatic hydrocarbons such as benzene, hexane, octane, toluene, xylol, and also aliphatic alcohols such as ethanol, n-propanol, isopropanol, butanol, glycolethers such as methylglycol, ethylglycol, butylglycol, butyldiglycol and esters of aliphatic monocarboxylic acids containing monovalent aliphatic alcohols such as ethyl acetate, butyl acetate, ethyl propionate.

Up to 5 parts by weight of the non-reactive solvents of component D may optionally be substituted by monomeric, copolymerizable solvents. These are ethylenically unsaturated copolymerizable substances which may be used individually or in a mixture such as styrene, vinyl toluene, methylacrylate, methylmethacrylate, ethylacrylate, ethylmethacrylate, allyl compounds and divinylbenzene. All copolymerizable, monomeric liquids are generally suitable.

Plasticizers, anti-foaming agents, flow agents, etc., and substances and compounds in general which influence or vary the specific technological properties of the coating composition and/or the hardened coatings are used as the common auxiliary agents and additives.

Light hardenable coating compositions which may be hardened by irradiation with UV light or sunlight contain photosensitizers as hardening catalysts. Apart from benzoin, suitable sensitizers are also its derivatives such as benzoinmethylether, benzoinethylether, benzoinpropylether, benzoinisopropylether, benzoinacetate, α-benzylbenzoin, α-methylbenzoin. Other suitable photosensitizers belong to the disulfide group. Other sensitizers are: benzil acetophenone, anthraquinone derivatives, benzophenone, phenanthrenequinone, diacetyl, tetramethylthiuram disulfide, naphthalenesulfoacidchloride, bromotrichloromethane, bromoform, manganesecarbonyl, hexaarylimideazole. All substances in general which are commonly used as photosensitizers and disclosed in U.S. Pat. Nos. 3.196,098; 3,008,242; 3,013,895; 3,060,023; 3,511,687; and 3,551,311 may be used for curing purposes. However, these are not the subject of this patent application and are not claimed herein.

The UV rays used for the curing process are generally produced by mercury-vapor high pressure lamps such as disclosed in U.S. Pat. No. 3.511,687.

The known UV curing processes are described in the articles, "Die Lichthartung von Polyesterlacken," Eugen Richter, Moderne Holzverarbeitung, Issue 10, 1968, pages 604–606, and "Lackhartung durch ultraviolettes Licht," Dr. W. Deninger and Dr. M. Partheiger, Industrie-Laskier-Betrieb, 37, Jg. Issue 3, March 1969, pages 85–91. Sunlight or other powerful ionizing rays may also be used for the curing process in place of UV rays.

The covering, opaque coatings may be obtained in any color miscible with white by the admixture of dyes. Specific examples of these dyes include zapon-fast-yellow, zapon-fast-brown, irisol-fast-green, irisol-fast-red. Generally all dyes suitable for transparent coloring can be used alone or in mixtures. Even organic color-pigments as for example indanthren-dyes are suitable as long as transmission for radiation in the composition is given.

The time required for the hardening of coating materials depends on the polymerization activity of the coating composition, the composition and the quantity of the photosensitizers and on the quality and amount of the light energy and on the layer thickness of the coating composition applied. The coating composition to be applied may be in the form of a solution or a dispersion.

The coating materials according to the invention may be applied to wood, wooden materials, pressed materials, plastics, glass, pasteboard, asbestos or metal by normal methods of application such as pouring, spraying, or rolling. The coating may also be applied by electrodeposition on conductive substrates.

The amount applied per unit of surface area varies according to the substrate and the proposed application. The covering capacity of the opaque coating is lower if the layer thickness is smaller. Covering layers with a 50 micron dry film thickness may also be obtained. Depending on the intended use and the method of application, the preferred layer thicknesses are between 50 and 700 microns.

The following examples are intended to illustrate the invention but not to limit it. The parts quoted are parts by weight. The percentages indicated are percentages by weight.

EXAMPLE 1.

A. An unsaturated polyester resin is produced in a conventional manner as a condensation product from the following substances:
20 parts diglycol,
9 parts dipropylglycol,
3 parts trimethylolpropane,
19 parts maleic anhydride,
15 parts tetrahydrophthalic anhydride.
0.003 parts hydroquinone are added to this mixture and a resin having an acid number of 35 and a double bond value of 0.314 is obtained which is then further diluted with ethylglycol at a temperature of between 90° and 95°C to a solid material content of 60 percent.

B. A coating composition is produced from the following constituents:
26 parts of the solution obtained according to 1A,
9 parts ethylglycol,
3 parts of a 25 percent solution of celluloseacetobutyrate in ethanol/toluene in a ratio of 2:1,
1.3 parts benzoinisopropylether,
41 parts permanent white,
8 parts talcum, grain size 5 - 10 microns,
0.7 parts zinc stearate,
11 parts precipitated calcium carbonate.

Approximately 130 g per m² of this coating composition are applied to a chipboard by means of a machine for applying a coating. The chipboard bearing the layer of coating composition is then passed through a drying channel in which the mercury vapor high pressure lamps (HTQ 7 by Philips) are arranged in series at intervals of 25 cms. The distance of the layer to be hardened from the mercury vapor high pressure lamps is about 10 – 20 cms. The curing process takes 60 seconds.

A pure white layer which is opaque and can be polished, is obtained.

EXAMPLE 2.

A. A condensation product consisting of the following components is produced in the conventional manner:

26 parts 1.2 propyleneglycol,
16 parts maleic anhydride,
20 parts phthalic anhydride.

0.003 parts hydroquinone are added to the mixture as described under 1A and the resin is diluted with ethyleneglycol/toluene at a ratio of 1 : 1 at a temperature of between 90° and 95°C to a solid material content of 65 percent.

The solid resin obtained has an acid number of 42 and a double bond value of 0.418.

B. The process is continued in a similar manner to that described in Example 1B, with the only difference being that in place of the resin-solution 1A, the resin solution 2A is used. The coating composition is applied as described in Example 1B to a chipboard and hardened with UV rays. A white opaque layer with a smooth, pore-free surface is obtained.

EXAMPLE 3.

0.5 parts zapone brown dye are added to the coating composition obtained in Example 1. The coating obtained in the same manner as in Example 1 is a uniform brown color and has an excellent covering capacity.

We claim:
1. In a method of coating a substrate with an opaque coating by applying a coating composition containing film forming synthetic resins, filler materials, solvents, sensitizers and curing the deposited film by UV-radiation, the improvement comprising said coating composition consisting essentially of:
   A. about 14 to 20 parts by weight of photosensitized light curing condensation resins having double bond values of about 0.180 to 0.450;
   B. about 55 to 75 parts by weight of filler materials having refractive indices not exceeding 1.70;
   C. about 0.5 to 10 parts by weight of resins selected from the groups consisting of film forming cellulose derivatives or copolymers of vinyl chloride with other monomers compatible with component A; and
   D. about 8 to 30 parts by weight of non-reactive solvents for the resins A and C.
2. The method of claim 1, wherein said component A is about 15 to 18 parts by weight, said component B is about 65 to 70 parts by weight, said component C is about 1 to 6 parts by weight, said component D is about 10 to 20 parts by weight and up to about 5 parts by weight of said component D is replaced by monomeric copolymerizable solvents.
3. The method of claim 2, wherein said coating composition contains radiation transparent coloring agents.
4. The coated article obtained by the method of claim 1.

* * * * *